US 6,526,173 B1

(12) United States Patent
Burns

(10) Patent No.: US 6,526,173 B1
(45) Date of Patent: Feb. 25, 2003

(54) METHOD AND SYSTEM FOR COMPRESSION ENCODING VIDEO SIGNALS REPRESENTATIVE OF IMAGE FRAMES

(75) Inventor: Ronnie R. Burns, Irvine, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/025,141

(22) Filed: Feb. 18, 1998

Related U.S. Application Data

(63) Continuation-in-part of application No. 08/551,048, filed on Oct. 31, 1995, now abandoned.

(51) Int. Cl.[7] .............................. G06K 9/36; G06K 9/46
(52) U.S. Cl. ...................................... 382/236; 382/243
(58) Field of Search ................................. 382/236, 238, 382/239, 243, 248, 250; 348/402, 407, 409, 413, 416, 431, 699, 384–440, 384.1–440.1; 375/240.8; 358/261.2, 430; 345/436, 438, 474, 475, 648, 672, 681

(56) References Cited

U.S. PATENT DOCUMENTS

| 5,253,065 A | | 10/1993 | Richards et al. ............. 358/182 |
|---|---|---|---|
| 5,305,400 A | * | 4/1994 | Butera ......................... 382/107 |
| 5,412,435 A | * | 5/1995 | Nakajima .................... 348/699 |
| 5,485,611 A | | 1/1996 | Astle ........................... 395/600 |
| 5,557,684 A | * | 9/1996 | Wang et al. ................. 382/107 |
| 5,623,587 A | | 4/1997 | Bulman ....................... 395/135 |
| 5,646,675 A | | 7/1997 | Copriviza et al. ............. 348/1 |
| 5,703,966 A | * | 12/1997 | Astle ........................... 382/236 |
| 5,831,688 A | * | 11/1998 | Yamada et al. .............. 348/699 |

FOREIGN PATENT DOCUMENTS

GB        2 289 819       11/1995       .......... H04N/13/02

OTHER PUBLICATIONS

Publication entitled *Video Compression via Morphing* by Lai Khen Siew, Nov. 21, 1995, pp. 1–19.
Beier, et al. "The Feature–Based Image Metamorphosis", ACM–0–89791–479, 1992.

* cited by examiner

*Primary Examiner*—Timothy M. Johnson
(74) *Attorney, Agent, or Firm*—John A. Crook; Michael W. Sales

(57) ABSTRACT

A method and system for compression encoding a video signal representative of a plurality of image frames which include a starting frame, an ending frame, and at least one intermediate frame, provides for identifying key points of at least one object in the starting and ending frames. For each object, a mathematical transformation is determined which estimates a representation of the corresponding key points in each intermediate frame by mapping the feature points from the starting frame to the ending frame. The representation of the object in the starting frame and the mathematical transformation are encoded and multiplexed to form an object bit stream. Each object bit stream produced in response to a set of image frames is then multiplexed to form an image bit stream. A signal-to-noise ratio can be scaled by adjusting the number of feature points identified, which in turn allows the compression ratio to be selectively changed.

12 Claims, 3 Drawing Sheets

METHOD AND SYSTEM FOR COMPRESSION ENCODING VIDEO SIGNALS REPRESENTATIVE OF IMAGE FRAMES

This application is a continuation-in-part of application Ser. No. 08/551,048, entitled "Methods And Systems For High Compression Rate Encoding Of Objects In Video And Film," filed on Oct. 31, 1995 now abandoned.

TECHNICAL FIELD

The present invention relates to methods and systems for encoding and decoding digital video data.

BACKGROUND ART

Video compression systems are employed to reduce the number of bits needed to transmit and store a digital video signal. As a result, a lower bandwidth communication channel can be employed to transmit a compressed video signal in comparison to an uncompressed video signal. Similarly, a reduced capacity of a storage device, which can comprise a memory or a magnetic storage medium, is required for storing the compressed video signal. A general video compression system includes an encoder, which converts the video signal into a compressed signal, and a decoder, which reconstructs the video signal based upon the compressed signal.

In the design of a video compression system, an objective is to reduce the number of bits needed to represent the video signal while preserving its visual content. Current methods and systems for video compression have achieved a reasonable quality of content preservation at a transmission bit rate of 56 kilobits per second. These methods and systems are based upon directly compressing a waveform representation of the video signal.

Motion compensation is one approach which is utilized in many video compression schemes. Current approaches model motion in terms of simple displacements of blocks or a global transformation of an entire scene to model camera motion.

SUMMARY OF THE INVENTION

The need exists for a video compression system which significantly reduces the number of bits needed to transmit and store a video signal, and which simultaneously preserves the visual content of the video signal.

It is thus an object of the present invention to significantly reduce the bit rate needed to transmit a video signal.

Another object of the present invention is to provide an efficient encoding of redundant temporal data contained within a digital video signal.

In carrying out the above objects, the present invention provides a method of encoding a video signal representative of a plurality of image frames. The plurality of image frames includes a starting frame, an ending frame, and at least one intermediate frame. In practice, high compression would be achieved by employing many frames of data between the starting frame and the ending frame. Included in the method is a step of identifying at least one object in the image frames, which can be performed such as by blue screen and chroma keying effects, or image segmentation either by hand or using automated signal processing techniques. During segmentation of the object, key points are identified. These key points are those that identify features on the object that should remain in essentially the same position relative to each other, for example, eyes, mouth, nose, ears, and hair line for a facial object.

For each object, a step of determining a mathematical transformation is performed. The mathematical transformation is determined by finding a single function that is applied to all the points in the object such that the function maps the selected key points from the starting frame to the ending frame. Since all intermediate frames can be constructed based on function, very high compression is achieved by the present invention because the encoded function requires an almost insignificant number of bits compared to the raw object data for the intermediate frames. As a consequence, the present invention provides a dynamic compression arrangement which produces correspondingly higher compression rates as the number of intermediate frames in the raw object data increases.

Further in carrying out the above objects, the present invention provides a method for decoding an encoded representation of a plurality of image frames. The plurality of image frames include a starting frame and at least one intermediate frame. The method includes a step of receiving an encoded signal containing an encoded representation for each of at least one object contained in a starting frame and of the same object contained in the ending frame of the image frames, and an encoded mathematical transformation for each of the at least one object. Each encoded representation is decoded to extract a representation for each of the at least one object in the starting frame and ending frame. Each encoded mathematical transformation is also decoded to extract a mathematical transformation for each of the at least one object. The representation for each object contained in the starting frame is transformed in accordance with the mathematical transformation corresponding thereto to form a transformed representation for each object in each of at least one intermediate frame. The transformation is used to map all of the points in the object in the starting frame to the intermediate frame and also to map all of the points in the ending frame to the intermediate frame. The points on the object in the intermediate frame are formed by combining the intermediate frame data derived from the starting frame with the intermediate frame data derived from the ending frame. The combination may be a linear or complex combination based upon the relative distance of the intermediate frame from the starting and ending frames. The transformed representation for each object is combined to form an intermediate frame. The steps of transforming and combining are repeated to form each intermediate frame.

Further in carrying out the above objects, systems are provided which perform the steps of the above-described methods.

Embodiments of the present invention advantageously produce high compression rates for coding object motion in video and film digital data. A practical temporal description of non-rigid, as well as rigid body motion for generic objects is provided based on actual object deformation rather than artificial motion descriptions based on arbitrary block matching techniques or even pixel matching techniques. This approach complements methods that provide a global description of camera motions such as zoom and pan.

These and other features, aspects, and embodiments of the present invention will become better understood with regard to the following description, appended claims, and accompanying drawings.

BEST MODES FOR CARRYING OUT THE INVENTION

Figure 1:
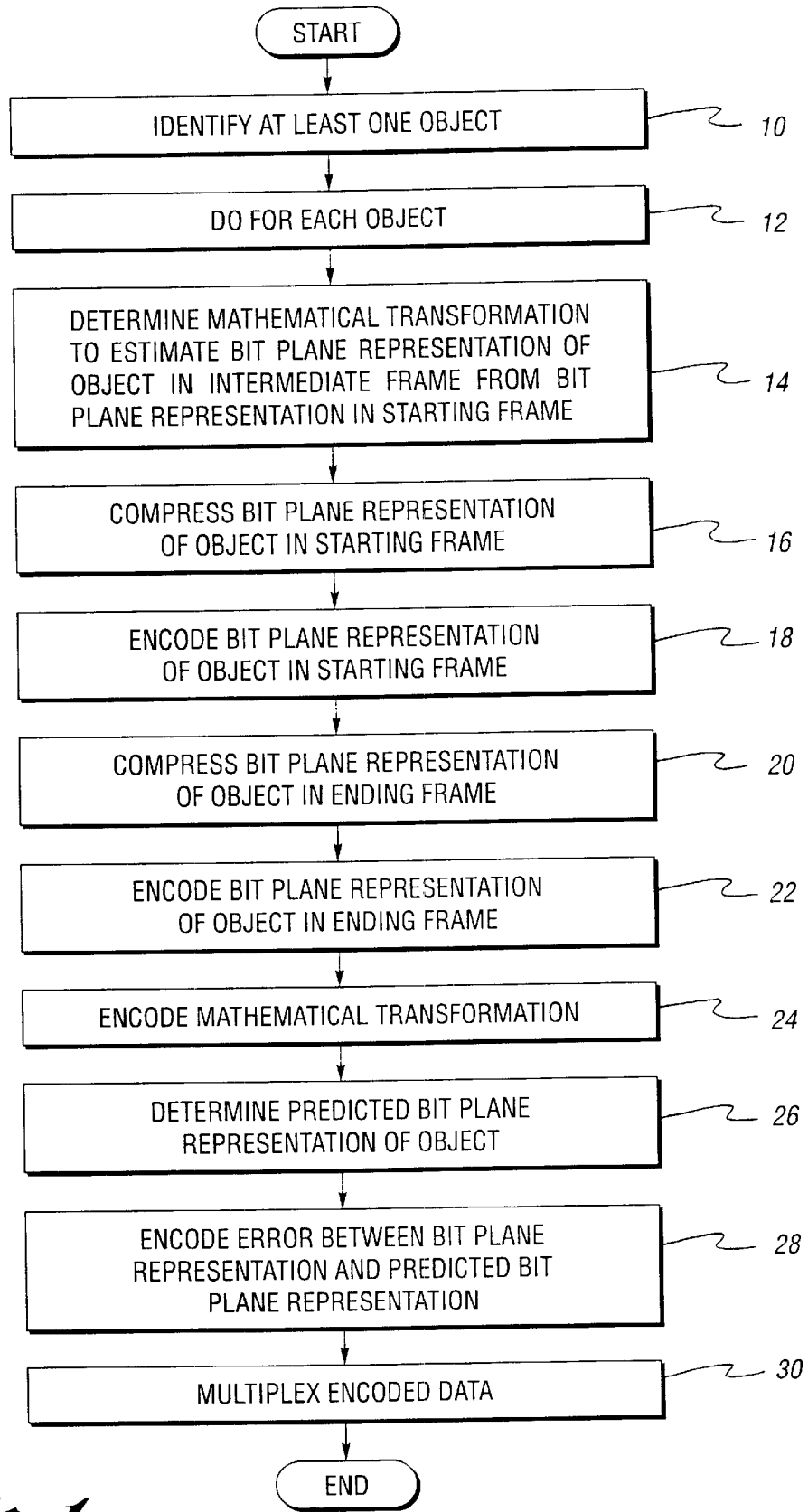
FIG. 1 is a flow diagram of an embodiment of a method of encoding a video signal representative of a plurality of image frames.

Referring to FIG. 1, there is shown a flow diagram of an embodiment of a method of encoding a video signal representative of a plurality of image frames. The plurality of image frames includes a starting frame, an ending frame, and at least one intermediate frame. As indicated by block 10, the method includes a step of identifying at least one object in the image frames. The at least one object can be identified using object identification methods known in the art of image processing. Many object identification methods include a step of segmenting the image frames, i.e., subdividing each image frame into at least one object. For the purpose of this application, an object of an image frame can be representative of a constituent part of the image frame, a region of the image frame, or another entity of interest in the image frame.

As indicated by block 12, a series of steps are performed for each object identified in block 10. Specifically, a step of determining a mathematical transformation is performed for each object as indicated by block 14. The mathematical transformation is determined by the representation of the object in the starting frame and a representation of the object in the ending frame. As part of the object identification, key points on the object are identified in the starting frame and the corresponding feature points are also identified in the ending frame. The feature points are connected by means of a mathematical transform that maps the feature points in the starting frame to the corresponding feature points in the ending frame. The transformation as a function of the points in time corresponding to the intermediate frames may be either linear or non-linear. In the later case, the feature points need to be identified in the intermediate frames and be used also in determining the mathematical transformation. This set of feature points, which is small in comparison to the total number of feature points in the object, is used to determine the mathematical transformation by defining a function that has a number of free parameters on the same order as the number of feature points to be transformed. Using well known mathematical techniques, a fit is made to determine the parameter from the feature point set. The criteria for the fit may be based upon minimizing the difference between the calculated point and the actual point in the image, and on minimizing the complexity of the mathematical transforms by removing parameters which are small or of minimal impact. In other words, the mathematical transformation maps picture element points in the starting frame to their new location in each of the at least one intermediate frame.

Hence, the mathematical transformation is a "morphing transformation" based upon a plurality of feature points. Here, the feature points are identified for an object in at least the starting frame and the ending frame. A mapping of some number of chosen feature points is calculated to smoothly transform the image from the starting frame to an intermediate frame. The synthesized set of object images can be generated by an interpolation transforming the original images of the starting and ending frames to each of the new image times that can correspond to the intermediate original frame times, and blending the transformed images from the starting and ending frame. The blending strengths of the starting frame and ending image is a function of the distance of these images from the intermediate frame in which the object is being reconstructed. While linear mixing is usually employed, this is not to be construed as limiting since nonlinear mixing may also be used. However, an advantage of this approach is that the new image times do not necessarily have to correspond to the original frame times.

In general, different types of mathematical transformations may be utilized for each of the identified objects. For example, the mathematical transformation for one identified object may be based upon a motion vector representative of translational motion of the object between the starting frame and the ending frame. For translational motion of a rigid object, the mathematical transformation would consist of a single motion vector.

Alternatively, the mathematical transformation can include an affine transformation representative of a zooming and a panning of the object between the starting frame and the ending frame.

As indicated by block 16, an optional step of compressing the representation of the object in the starting frame is performed. This step may be performed prior to a step of encoding the representation of the object in the starting frame, as indicated by block 18. optionally, the representation of each object in the ending frame is compressed and encoded, as indicated by blocks 20 and 22. Various compression and encoding schemes known in the art of image processing may be utilized in these steps, and do not form a part of the present invention.

As indicated by block 24, a step of encoding the mathematical transformation is performed. This step typically entails encoding one or more formulae and/or parameters. Hence, sequence of frames of an object can be described by an encoded original object along with the encoded mathematical transformation. A high compression ratio is achieved because of the reduced number of bits required to encode a mathematical formula in comparison to encoding detailed pixel data.

The realism of the object can be increased and the coding error reduced to any level by determining an error signal between the predicted object and the original object. Hence, optionally, a step of determining a predicted representation of an object in an intermediate frame is performed as indicated by block 26. Here, the predicted representation is determined using the mathematical transform for the object, the representation of the object in the starting frame, and optionally, the representation of the object in the ending frame. Further, a step of encoding an error between the representation of the object and the predicted representation is performed, as indicated by block 28. This is a standard technique for enhancing the decompressed image and the details of which do not form a part of the present invention.

As indicated by block 30, all of the encoded data for an object is multiplexed to form an object bit stream. One or more object bit streams can then be multiplexed to form an image bit stream representative of the entire image.

It is noted that the starting and ending frame which defines a time duration may be different for each object. In other words, the range of images over which a mathematical transformation is valid can be different for any or all of the objects in the image.

Further, different objects may have more or less accurate residual error correction depending on the priority of the object in the visual perception of the scene and the available data rate. The present invention provides a new type of signal-to-noise ratio scalability based on statistical multiplexing of the object bitplane residual error data. Additional SNR scalability and/or higher compression ratios can be achieved by reducing the number of feature points used in describing an object.

Figure 2:
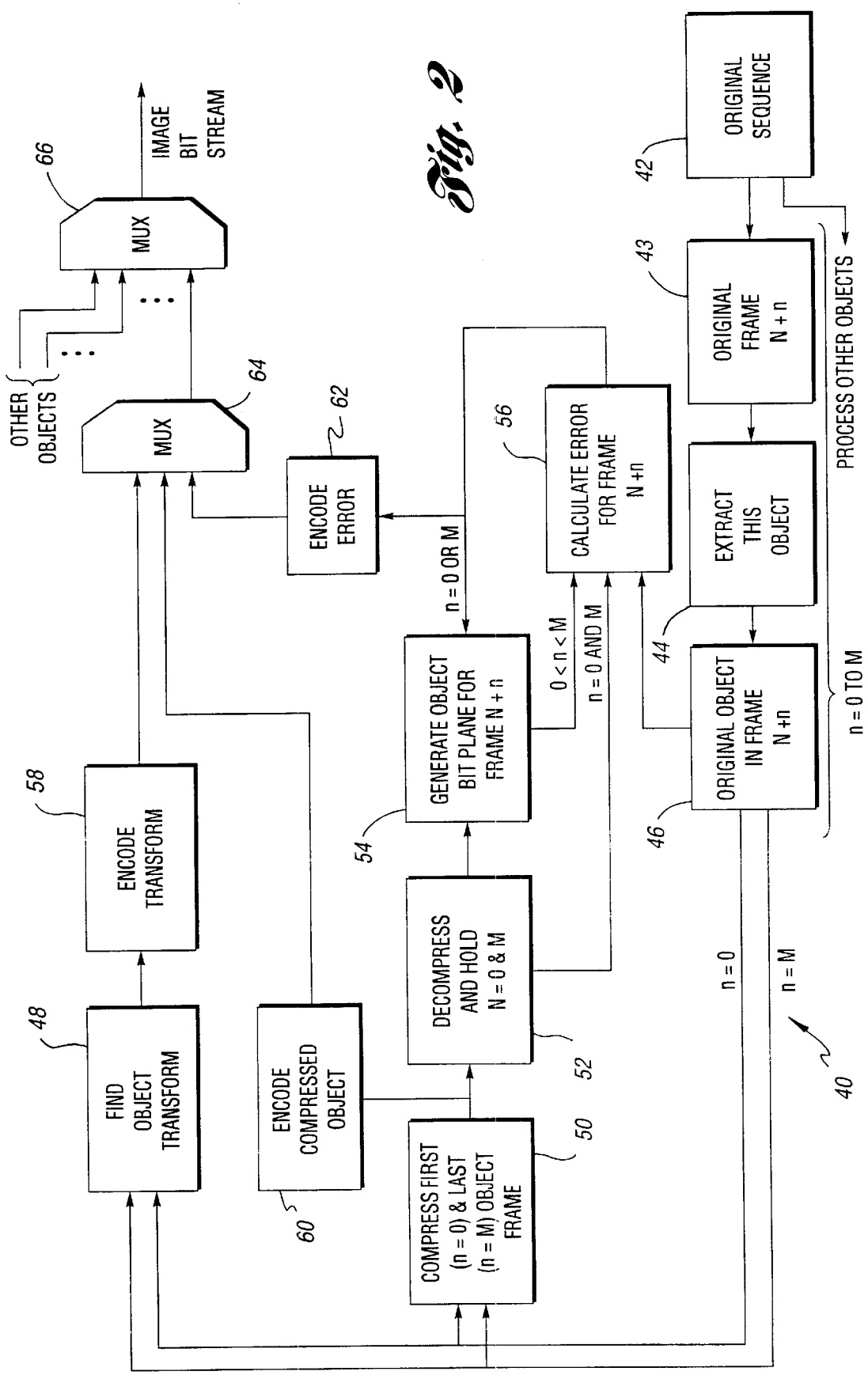
FIG. 2 is a block diagram of a video compression system in accordance with an embodiment of the present invention.

FIG. 2 is a block diagram of a video compression system in accordance with an embodiment of the present invention. The video compression system includes an image processor 40 which receives the plurality of image frames 42 indexed from frame N (the starting frame) to frame N+M (the ending frame). For an index n running from 0 to M, an original frame N+n is extracted in block 42, an object is extracted therefrom in block 44, to produce an original object in frame N+n in block 46. A mathematical transformation for the object is determined based on the original object in frame N and the original object in frame N+M by block 48.

The original object in frame N and frame N+M are also applied to a compressor 50, which compresses the first and last object frames. The compressed first and last object frame are decompressed and held by a decompressor 52. A predicted representation of the object for frame N+n, where 0<n <M, is generated by block 54 based on the mathematical transformation and the decompressed original objects in frame N and N+M. The error between the predicted representation and the original representation of the object is determined by block 56.

The mathematical transform is encoded by an encoder 58, the compressed first and last object frames are encoded by an encoder 60, and the error is encoded by an encoder 62. The encoders 58, 60, and 62 are applied to a multiplexer 64 which forms an object bit stream. A multiplexer 66 forms an image bit stream based upon a number of object bit streams. The image bit stream can be transmitted to a receiver for decoding the bit stream to produce a decoded sequence of images.

Figure 3:
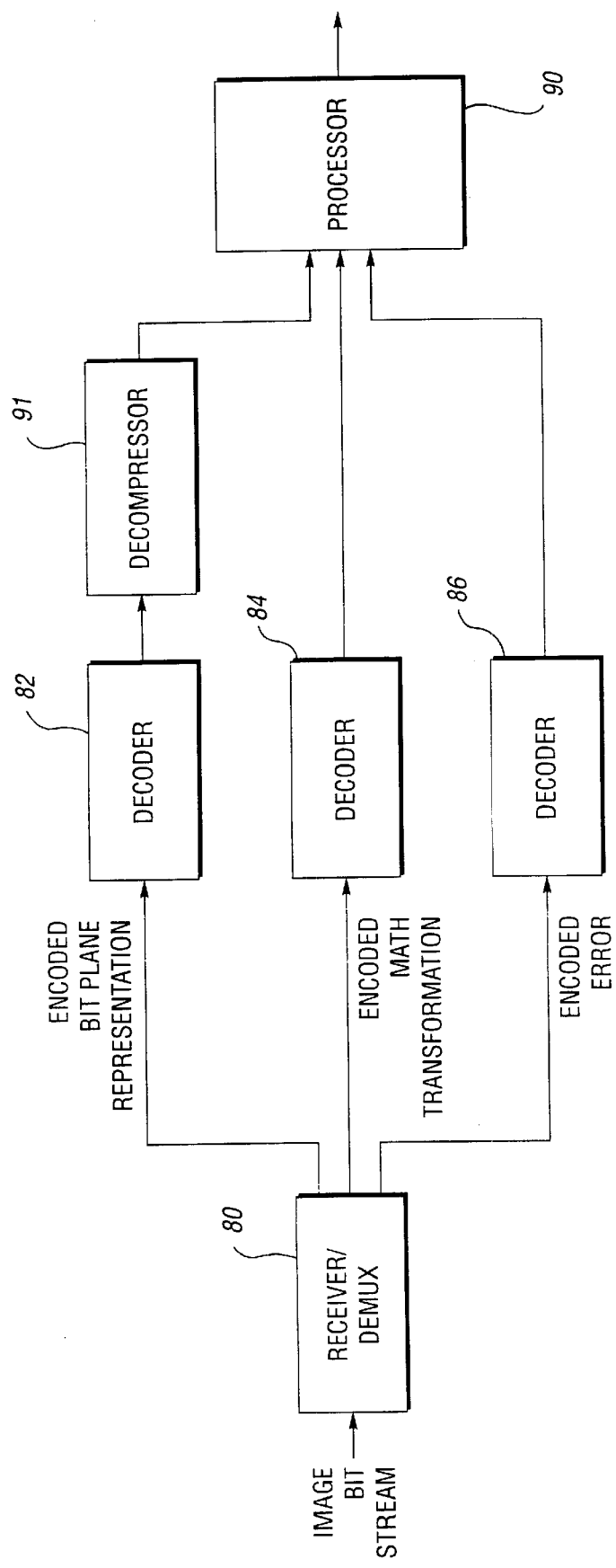
FIG. 3 is a block diagram of a system for decoding a bit stream representative of a plurality of image frames.

FIG. 3 shows a block diagram of a system for decoding an image bit stream formed using an embodiment of the video compressor of the present invention. The system includes a receiver 80 to receive an encoded signal containing an encoded representation for each of at least one object contained in a starting frame and optionally, an ending frame. The encoded signal further contains an encoded mathematical transformation for each of the at least one object. optionally, the encoded signal includes a representation of an error between a representation of an object and a predicted representation.

A decoder 82 is coupled to the receiver 80 to decode each encoded representation to extract a repres entation for each of the at least one object in the starting frame and the ending frame. Another decoder 84 decodes each encoded mathematical transformation to extract a mathematical transformation for each of the at least one object. Optionally, a third decoder 86 decodes an encoded error signal to extract an error signal for one or more of the objects.

A processor 90 communicates with the decoders 82, 84, and 86. This communication can occur via a decompressor 91 which decompresses the representation of the object in the starting frame and ending frame. The processor 90 transforms the representation for each of the at least one object contained in the starting and ending frame in accordance with the mathematical transformation corresponding thereto, which also contains the information for blending the intermediate representations obtained from the starting and ending frames. As a result, a transformed representation for each object is formed. The processor 90 combines the transformed representations to form an intermediate frame. The processor 90 repeatedly transforms and combines to form a series of intermediate frames. These intermediate frames can be displayed for view on a display device.

If received, the error signal between the generated intermediate frame and the real intermediate frame can be utilized by the processor 90 to improve the realism of the intermediate frame. The error signal, including one for the original compressed frame, is received in dependence upon available channel bandwidth. Consequently, the error signal allows improvement of the intermediate frame to the extent that the data rate allows transmission of the residual bits.

The above-described embodiments of the present invention have many advantages. By describing rigid or semi-rigid object motions by means of a transformation which maps an object from a previous frame into the current frame's configuration for the object, embodiments of the present invention provide an efficient encoding method of redundant temporal data in digital video or film data.

By transmitting a representation of an object in one frame along with a mathematical transformation which describes the object in other frames, a high compression ratio is achieved by not having to transmit redundant, detailed pixel data. By transmitting error data between the generated object and the real object as it appears in each intermediate frame, the realism of the generated object can be improved to the extent that the data rate allows transmission of the residual bits.

Further, embodiments of the present invention allow object data to be reconstructed at any intermediate time between the starting frame and ending frame. This allows for conversion of frame rate from the original video signal, if desired.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method for compression encoding a video signal representative of a plurality of image frames including a starting frame, an ending frame, and at least one intermediate frame, the method comprising:

receiving the plurality of image frames;

identifying a plurality of feature points for at least one object in at least the starting frame and the ending frame; and for each object:

determining a mathematical transformation for estimating a representation of the object in each of the at least one intermediate frame based on an originally received representation of the object in the starting frame and an originally received representation of the object in the ending frame, wherein the mathematical transformation for the object comprises a morphing transformation which maps the identified feature points from the starting frame to the ending frame;

encoding the representation of the object in the starting frame; and encoding the mathematical transformation in place of the at least one intermediate frame, wherein the at least one intermediate frame is interpolated based on the encoded starting frame and the encoded mathematical transformation.

2. The method of claim 1 further comprising adjusting the number of feature points to scale a signal-to-noise ratio of the compressed video signal.

3. The method of claim 2 further comprising reducing the number of feature points to provide a higher compression ratio.

4. The method of claim 1 wherein said step of determining a mathematical transformation comprises a linear function of the feature points in time.

5. The method of claim 1 wherein said step of determining a mathematical transformation comprises identifying the plurality of feature points in the at least one intermediate frame, and generating a nonlinear function of the feature points in time.

6. The method of claim 1 further comprising:

determining a predicted representation of one object in one intermediate frame, the predicted representation determined using the mathematical transformation for the one object; and encoding an error between the original received representation of the one object and the predicted representation.

7. A system for compression encoding a video signal representative of a plurality of image frames including a starting frame, an ending frame, and at least one intermediate frame, the system comprising:

a receiver for receiving the plurality of image frames;

an image processor operative to identify a plurality of feature points of at least one object in at least the starting frame and the ending frame, and to determine a mathematical transformation for each object, the mathematical transformation estimating a representation of the object in each of the at least one intermediate frame by transforming a representation of the object in the starting frame based upon both the representation of the object in the starting frame and in the ending frame, wherein the mathematical transformation for the object is a morphing transformation based upon the feature points of the object;

a first encoder operatively associated with the image processor to encode the representation of each object in the starting frame and ending frame;

a second encoder operatively associated with the image processor to encode the mathematical transformation in place of the at least one intermediate frame, wherein the at least one intermediate frame is interpolated based on the encoded starting frame and the encoded mathematical transformation.

8. The system of claim 7 wherein the image processor is further operative to adjust the number of feature points identified so as to scale a signal-to-noise ratio of the compressed video signal.

9. The system of claim 7 wherein the image processor is further operative to determining a predicted representation of one object in one intermediate frame, the predicted representation determined using the mathematical transformation for the one object, the image processor operative to determine an error between the original received representation of the one object and the predicted representation, the system further comprising a third encoder for encoding the error.

10. The system of claim 7 wherein the image processor is further operative to determine the mathematical transformation as a linear function of the plurality of feature points in time.

11. The system of claim 7 wherein the image processor is further operative to identify the plurality of feature points in the at least one intermediate frame, and to generate the mathematical transformation as a nonlinear function of the plurality of feature points in time.

12. A method for decoding a compressed encoded representation of a plurality of image frames including a starting frame, at least one intermediate frame, and an ending frame, the method comprising:

receiving an encoded signal containing an encoded representation for each of at least one object contained in the starting frame and corresponding encoded mathematical transformations for each of the at least one object contained in the starting frame, wherein each mathematical transformation includes a morphing transformation for a corresponding one of the at least one object contained in the starting frame, wherein each morphing transformation is based upon a mapping of a plurality of feature points for the corresponding one of the at least one object contained in the starting frame from the starting frame to the ending frame;

decoding each encoded representation to extract a representation for each of the at least one object contained in the starting frame;

decoding each encoded mathematical transformation to extract a mathematical transformation for each of the at least one object contained in the starting frame;

transforming the representation for each of the at least one object contained in the starting frame in accordance with only the mathematical transformation corresponding thereto to form a transformed representation for each of the at least one object contained in the starting frame; and combining the transformed representation for each of the at least one object contained in the starting frame to form an intermediate frame;

wherein the steps of transforming and combining are repeated to form each of the at least one intermediate frames.

\* \* \* \* \*